United States Patent [19]
Kamiyama et al.

[11] Patent Number: 5,498,389
[45] Date of Patent: Mar. 12, 1996

[54] METHOD AND APPARATUS FOR LINING A BRANCH PIPE

[75] Inventors: Takao Kamiyama, Hiratsuka; Yasuhiro Yokoshima, Ibaraki; Shigeru Endoh, Kasukabe, all of Japan

[73] Assignee: Shonan Gosei-Jushi Seisakusho K.K., Japan

[21] Appl. No.: 212,777

[22] Filed: Mar. 15, 1994

[30] Foreign Application Priority Data

Mar. 23, 1993 [JP] Japan .................................. 5-063595

[51] Int. Cl.⁶ ................................................ B29C 63/36
[52] U.S. Cl. .......................... 264/516; 156/287; 156/294; 264/36; 264/269; 425/3
[58] Field of Search .............................. 264/35, 36, 269, 264/516, DIG. 58; 156/287, 294; 138/97, 98; 425/3, DIG. 33

[56] References Cited

U.S. PATENT DOCUMENTS

| 4,434,115 | 2/1984 | Chick ..................................... 264/269 |
| 5,356,502 | 10/1994 | Kamiyama et al. ..................... 264/269 |

FOREIGN PATENT DOCUMENTS

| 64-58525 | 3/1989 | Japan ..................................... 264/269 |
| 1361414 | 12/1987 | U.S.S.R. ................................. 138/97 |
| 1631223 | 2/1991 | U.S.S.R. ................................. 138/97 |
| 2075585 | 11/1981 | United Kingdom ....................... 425/3 |

Primary Examiner—Mathieu D. Vargot
Attorney, Agent, or Firm—Whitham, Curtis, Whitham & McGinn

[57] ABSTRACT

A method and apparatus for lining a branch pipe is provided which can directly achieve an air-tight connection between a pressure bag and a branch pipe liner bag in a simple structure without employing a conventionally required sealed tube. An open end of the pressure bag is attached to a set nozzle made of a magnetic material coupled to a work robot which is movably installed in a main pipe. A branch pipe liner bag, impregnated with a thermosetting resin, is placed inside the pressure bag. The liner bag has a flange which includes a magnetic plate so as to be magnetically connected to the set nozzle by a magnetic force of a magnet provided for the work robot. With the flange being closely contacted to the inner wall of the main pipe around a branch pipe opening, compressed air is supplied into the pressure bag to evert and insert the branch pipe liner bag into a branch pipe. While the branch pipe liner bag is pressed against the inner wall of the branch pipe, the thermosetting resin impregnated in the branch pipe liner bag is cured, whereby the inner wall of the branch pipe is lined with the cured thermosetting resin, i.e., the branch pipe is repaired. Upon completing the lining operation, the magnet is turned off to remove the work robot and the pressure bag from the branch pipe liner bag.

5 Claims, 8 Drawing Sheets

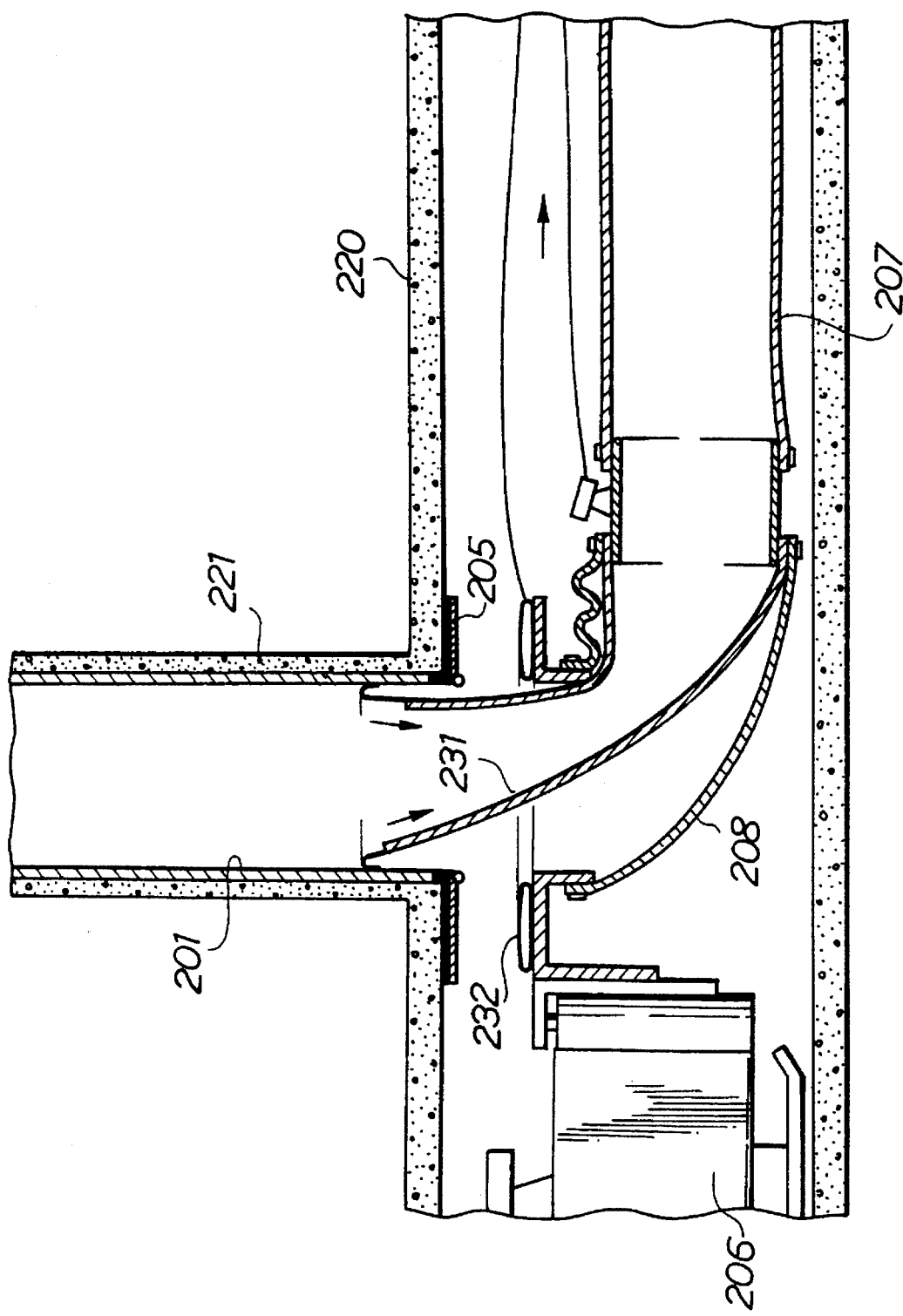

METHOD AND APPARATUS FOR LINING A BRANCH PIPE

BACKGROUND OF THE INVENTION

1. Field of the Invention

The present invention relates to a method and apparatus for lining a pipe by applying a liner bag on the inner wall of the pipe, and in particular to a method and apparatus for lining a branch pipe branching off a main pipe.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to the method described in the above-mentioned publication, the pipe repair method comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the the portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of procedure shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the the pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

This method is applicable to a pipe branching out from a main pipe as well, and how it is conducted will be described next with reference to FIG. 7.

FIG. 7 is a cross-sectional view showing a conventional method for lining a branch pipe. A pressure bag 107 is inserted into a main pipe 120. Since this pressure bag 107 must be separated from a branch pipe liner bag 101, a sealed tube 111 must be connected to the pressure bag 107 for applying a pressure to the branch pipe liner bag 101.

Then, compressed air or the like is supplied into the pressure bag 107. The sealed tube 111 and the branch pipe liner bag 101 are everted in a branch pipe 121, and the branch pipe liner bag 101 is heated to harden a hardenable resin impregnated therein while the illustrated state is held unchanged. Thereafter, when the sealed tube 111 is pulled out from the branch pipe 121 (branch pipe liner bag 101), the branch pipe has been lined by the hardened branch pipe liner bag 101. Thus, the inner wall of the branch pipe 121 is repaired.

With the above-mentioned conventional method, however, sealed tubes of proper lengths must be prepared depending upon variations in length of branch pipes every time a repair operation is required, wherein a problem arises that the sealed tube must be exchanged such that a suitable length is provided for a branch pipe to be repaired. Additionally, if a steeply angled bent portion is included in a branch pipe, the sealed tube may be caught by the bent portion, thus preventing the same from being extracted from the branch pipe.

To overcome the above-mentioned problems, a method for lining a branch pipe as shown in FIGS. 8 and 9 has been proposed (in Japanese Patent Application No. 3-156096). This method will hereinafter be described with reference to these drawings.

As shown in FIG. 8, a work robot 206 is introduced into a main pipe 220, and a set nozzle 211 of the work robot 206 and a pressure bag 207 are connected by a guide tube 208. Inside the guide tube 208, there is arranged a peel-back tube 231 which enables an air-tight connection between the pressure bag 207 and the branch pipe liner bag 201. More specifically, one end of the peel-back pipe 231 is attached to the pressure bag 207, while the other end of the same is temporarily adhered to the inner wall of the branch pipe liner bag 201 such that the peel-back pipe 231 may be easily detached therefrom after the repair operation is completed.

After a flange 205 of the branch pipe liner bag 201 is positioned at a peripheral edge of an opening formed through the branch pipe 221, when a compressor, not shown, is driven to supply compressed air to the pressure bag 207 and an air mat 232, the air mat 232 is inflated as shown in FIG. 8 to cause the flange 205 of the branch pipe liner bag 201 to tightly contact with the peripheral edge of the opening in the branch pipe 221. The branch pipe liner bag 201 located inside the pressure bag 207, receiving the pressure of the compressed air supplied into the pressure bag 207, is gradually everted and inserted into the branch pipe 221 in the direction indicated by the white arrow in the drawing.

When the eversion and insertion of the branch pipe liner bag 201 into the branch pipe 221 have been completed, a cap 233 is attached to an open end of the branch pipe liner bag 201, as shown in FIG. 9, to which an air hose 234 is connected to supply compressed air into the branch pipe liner bag 201, whereby the branch pipe liner bag 201 is pressed against the inner wall of the branch pipe 221. In this state, when a pump 235 is driven to inject hot water stored in a tank 236 into the branch pipe liner bag 201 through a hot water hose 237, the hot water provides heat to a thermosetting resin impregnated in the branch pipe liner bag 201 to cause the same to be cured. In this manner, the inner wall of the branch pipe 221 is lined with the cured branch pipe liner bag 201, thus completing the repair operation of the branch pipe 221.

After the branch pipe 221 has been lined as described above, hot water within the branch pipe liner bag 201 is extracted, and the pressure bag 207 is moved in the direction indicated by the arrows in FIG. 10. Then, since the pressure bag 207 and the work robot 206 are coupled through the guide tube 208, the work robot 206 is also moved together with the pressure bag 207, whereby the peel-back tube 231 temporarily adhered to the branch pipe liner bag 201 is peeled off from the temporarily adhered portion and then moved inside the main pipe 220 together with the pressure bag 207 and so on.

According to the method for lining a branch pipe as described above, since the air-tight connection between the pressure bag 207 and the branch pipe liner bag 201 is achieved by the peel-back tube 231, this method is advantageous in that the same peel-back tube 231 may be used for branch pipes of any length; the conventionally employed sealed tube 111 (see FIG. 7) can be removed; and steeply sloped, long, or largely curved branch pipes may be efficiently lined in a similar manner.

However, with the foregoing method for lining a branch pipe, when the peel-back tube 231 is peeled off from the branch pipe liner bag 201 as shown in FIG. 10, the temporarily adhered portion of the peel-back tube 231 may not be peeled and remain in the branch pipe liner bag 201, and the remaining portion may hinder a fluid from flowing inside the branch pipe 221.

OBJECT AND SUMMARY OF THE INVENTION

The present invention has been made in view of the above-mentioned problem, and its object is to provide a method and apparatus for lining a branch pipe which are capable of achieving in a simple structure a direct air-tight connection between a pressure bag and a branch pipe liner bag without employing the conventionally required sealed tube.

According to a first aspect, the present invention provides a method for lining a branch pipe branching off a main pipe comprising the steps of: (a) attaching an open end of a pressure bag to a set nozzle made of a magnetic material attached to a work robot which is movably introduced in the main pipe; (b) placing in the pressure bag a branch pipe liner bag impregnated with a thermosetting resin and having a flange at one end thereof, the flange comprising an annular magnetic plate embedded therein; (c) pulling out one end of the branch pipe liner bag at the flange side from the pressure bag and everting the branch pipe liner bag; (d) electromagnetically attracting the magnetic plate embedded in the flange to the set nozzle by turning on a magnet provided in the work robot to tightly connect the flange to the set nozzle; (e) supplying a pressurized fluid into the pressure bag with the flange being closely contacted to the inner wall of the main pipe around the perimeter of a branch pipe opening to evert and insert the branch pipe liner bag into the branch pipe; (f) curing the thermosetting resin impregnated in the branch pipe liner bag, the branch pipe liner bag being left pressed against the inner wall of the branch pipe until the thermosetting resin is cured; and (g) disengaging the flange from the set nozzle by turning off the magnet and removing the work robot and the pressure bag from the branch pipe liner bag.

In the branch pipe lining method of the present invention, since an air-tight connection between the pressure bag and the branch pipe liner bag is directly achieved by a magnetic force of the magnet, a peel-back tube required for conventional lining methods is made unnecessary, whereby the lining can be more easily performed as compared with the prior art.

When the lining operation is completed for a branch pipe, the magnet is turned off to allow the pressure bag and the work robot to be readily removed from the branch pipe liner bag. Since no peel-back tube is employed, the lining method of the present invention is free from the aforementioned problem inherent to the peel-back tube which may not be peeled favorably and partially remains inside the pipe.

According to a second aspect, the present invention provides a branch pipe lining apparatus for lining a branch pipe branched off a main pipe, comprising: a work robot, placed in the main pipe, including a main body, a head and a magnet; a set nozzle made of a magnetic material, the set nozzle being coupled to the robot; a pressure bag having an open end connected to the set nozzle and the other end closed by a cap; and a branch pipe liner bag including a tubular liner bag impregnated with a thermosetting resin; and a flange formed at one end thereof for connection with the set nozzle.

The set nozzle and the flange are tightly connected by a magnetic force generated by the magnet. Since this tight connection is magnetically made, it is readily released by turning off the magnet by remotely manipulating a magnet switch from the ground. Thus, the present invention provides an air-tight but readily releasable connection between the pressure bag and the branch pipe liner bag.

The above and other objects, advantages and features of the invention will appear more fully hereinafter in the following description given in connection with the accompanying drawings and the novelty thereof pointed out in the appended claims.

BRIEF DESCRIPTION OF THE DRAWINGS

FIGS. 7 through 10 are cross-sectional views respectively showing a procedure of a conventional branch pipe lining method.

DESCRIPTION OF THE PREFERRED EMBODIMENTS

One embodiment of the present invention will hereinafter be described with reference to the accompanying drawings.

Figure 1:
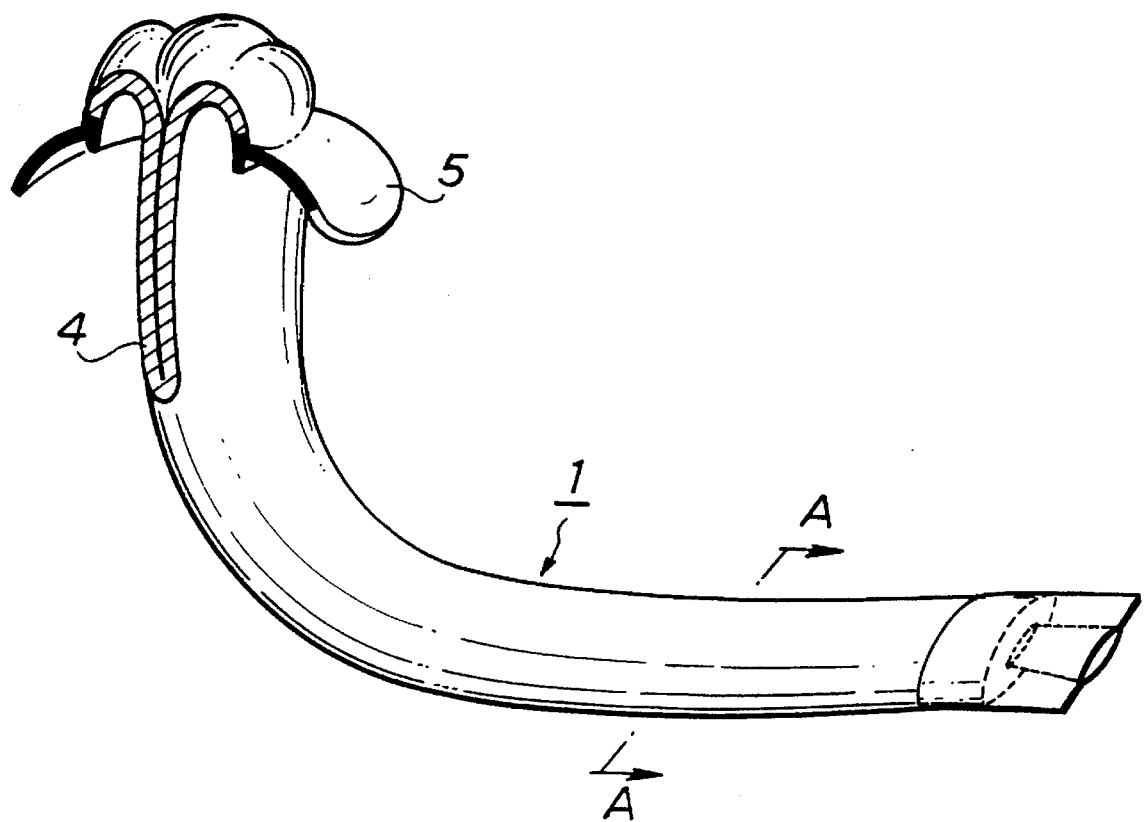
FIG. 1 shows a perspective view of a branch pipe liner bag used for the branch pipe lining method of the present invention with part thereof being exploded for explanation.
Figure 2:
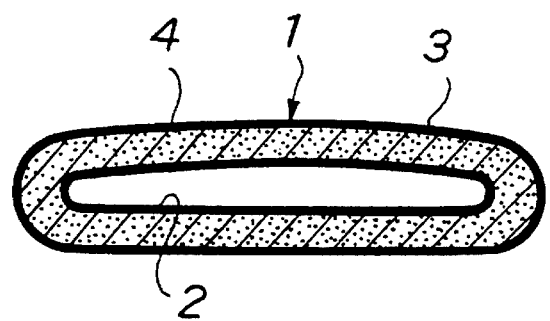
FIG. 2 is an enlarged cross-sectional view taken along a line A—A of FIG. 1.

FIG. 1 shows a perspective view of a branch pipe liner bag used for the branch pipe lining method of the present invention, wherein part thereof is exploded for illustrating the structure thereof; and FIG. 2 is an enlarged cross-sectional view taken along a line A—A of FIG. 1.

A branch pipe liner bag 1 shown in FIG. 1 has a tubular pipe liner bag 4 made of nonwoven fabric such as polyester, polypropylene, acrylic resin or the like, the outer surface of which is coated with highly air-tight plastic films 2 and 3 (see FIG. 2). The tubular pipe liner bag 4 is impregnated with a thermosetting resin. The plastic films 2, 3 may be made of polyurethane, polyethylene, polyethylene/nylon co-polymer, or polyvinyl chloride resin.

The branch pipe liner bag 1 to be inserted in the branch pipe 21 has its tail end closed, and the front end everted outwardly to form a flange 5 which is formed in an arcuate shape with a curvature equal to that of a main pipe 20 (see FIG. 3), later referred to. It should be noted that the outer diameter of the branch pipe liner bag 1 is selected to be larger than the inner diameter of a branch pipe 21 (see FIG. 3), later referred to, such that the flange 5 can maintain its shape by the hardening of the thermosetting resin impregnated therein.

Figure 6:
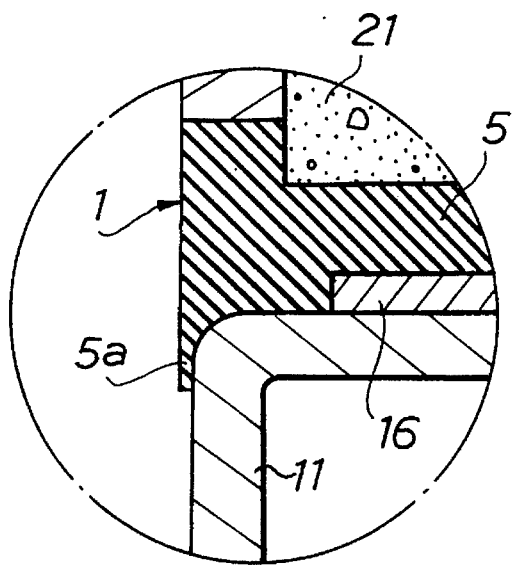
FIG. 6 is an enlarged view of a portion B in FIG. 5 for showing the structure in that portion in greater detail.
Figure 7:
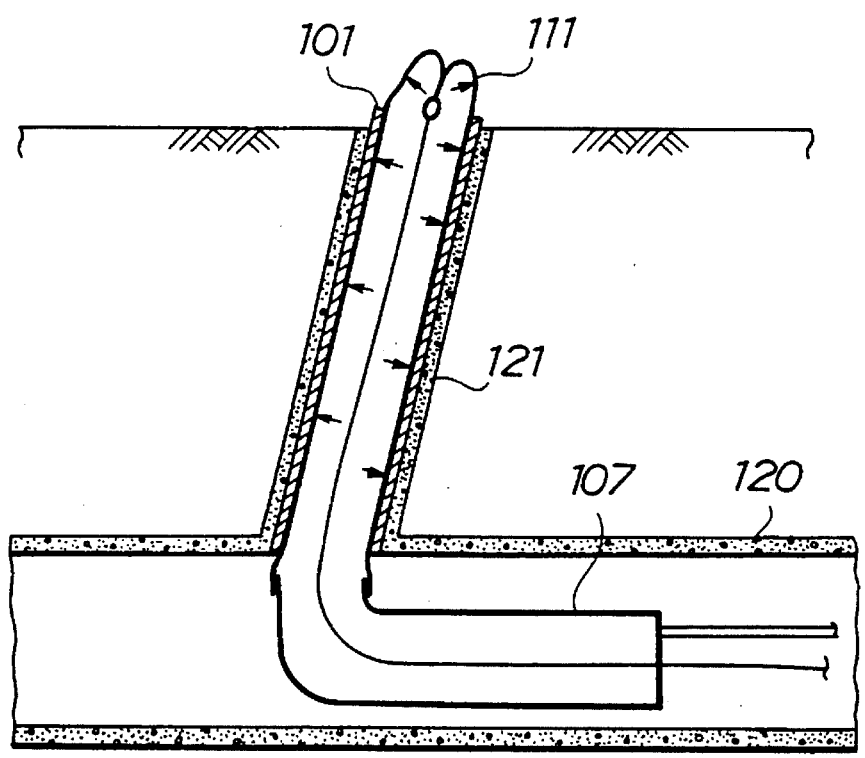
Figure 8:
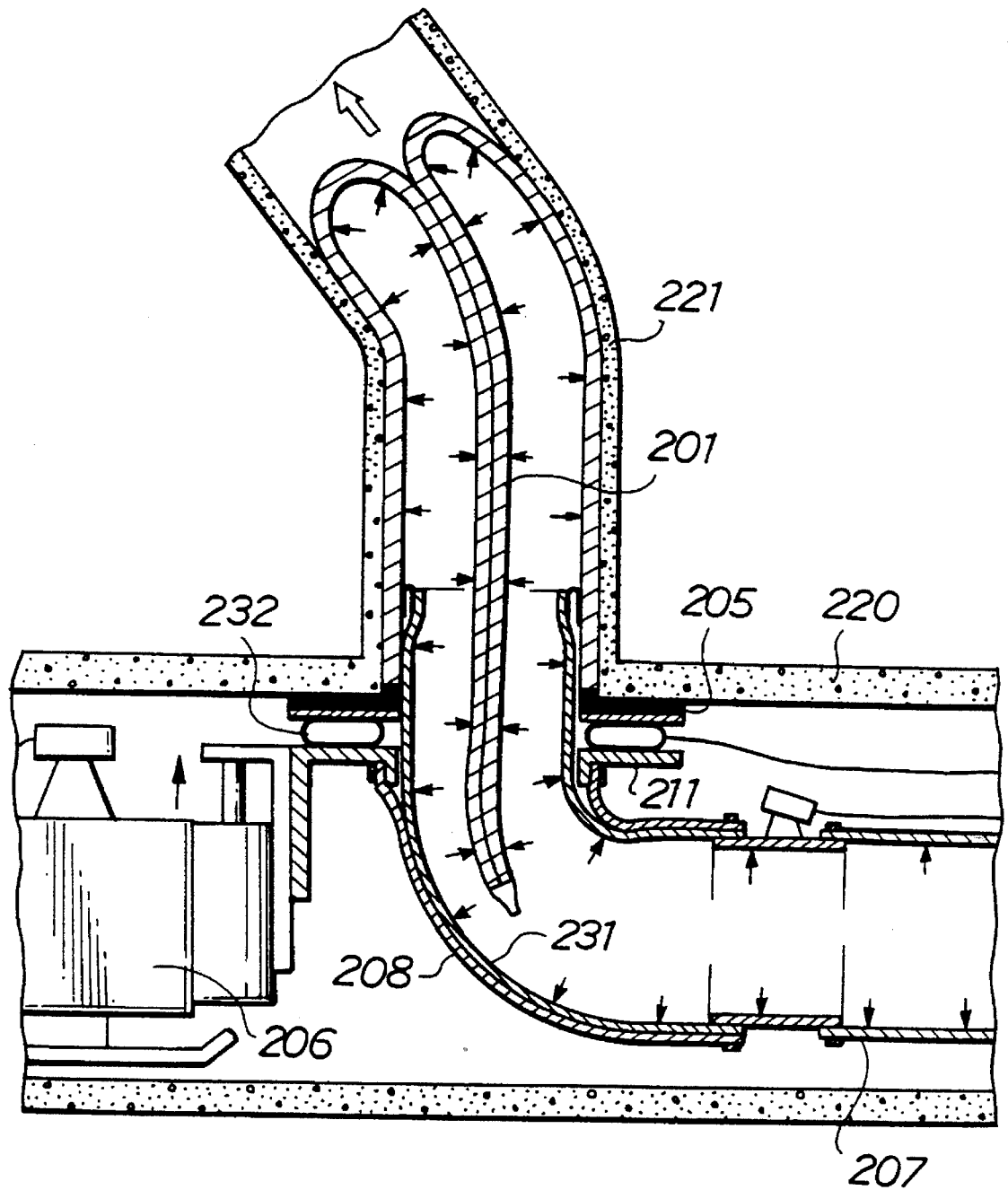
Figure 9:
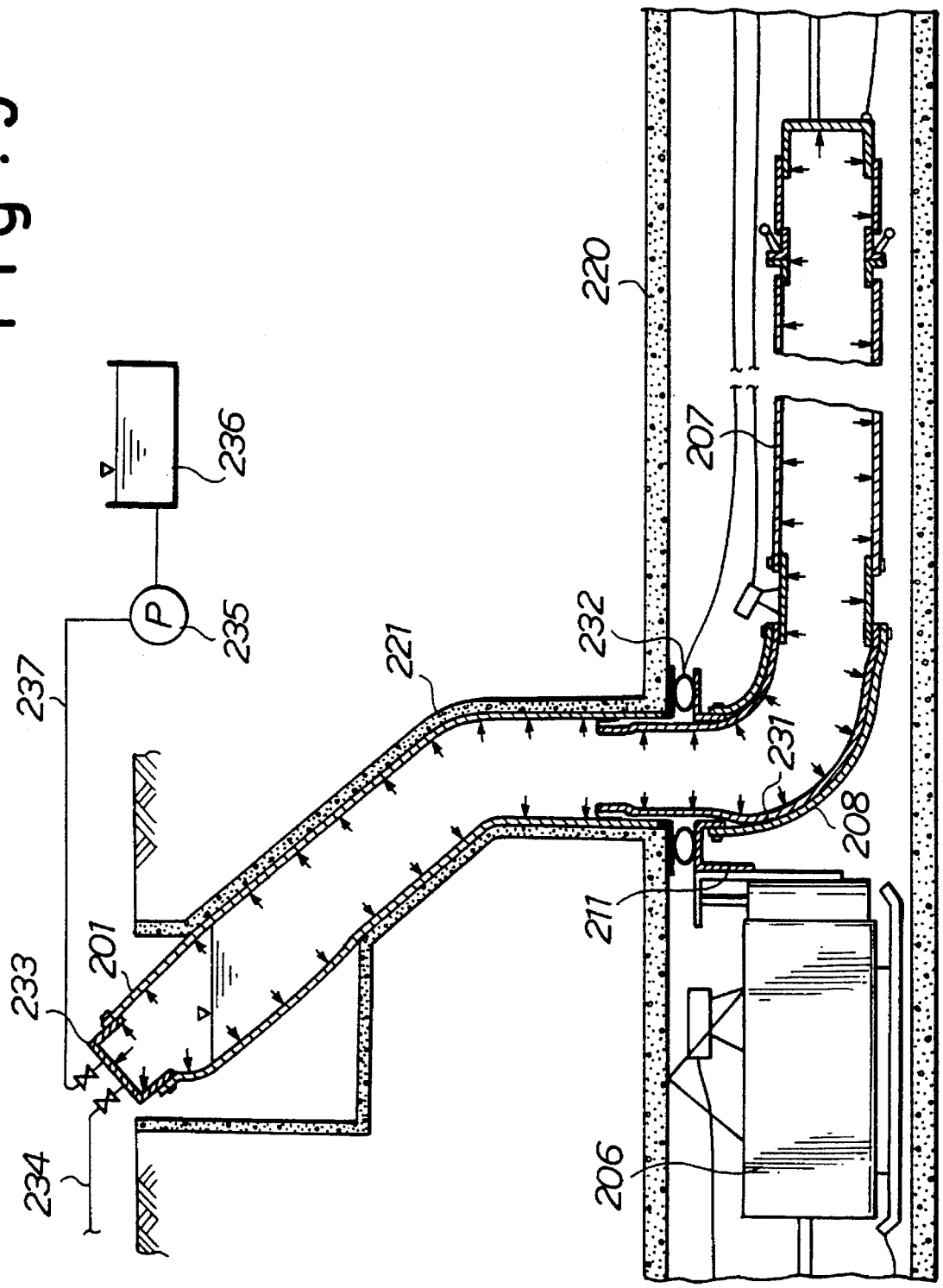

The branch pipe lining method by use of the branch pipe liner bag 1 according to the present invention will now be described with reference to FIGS. 2 through 6. FIGS. 2–5 are cross-sectional views showing the branch pipe lining method in the order of processes, and FIG. 6 is an enlarged view of a portion B indicated in FIG. 3.

Figure 3:
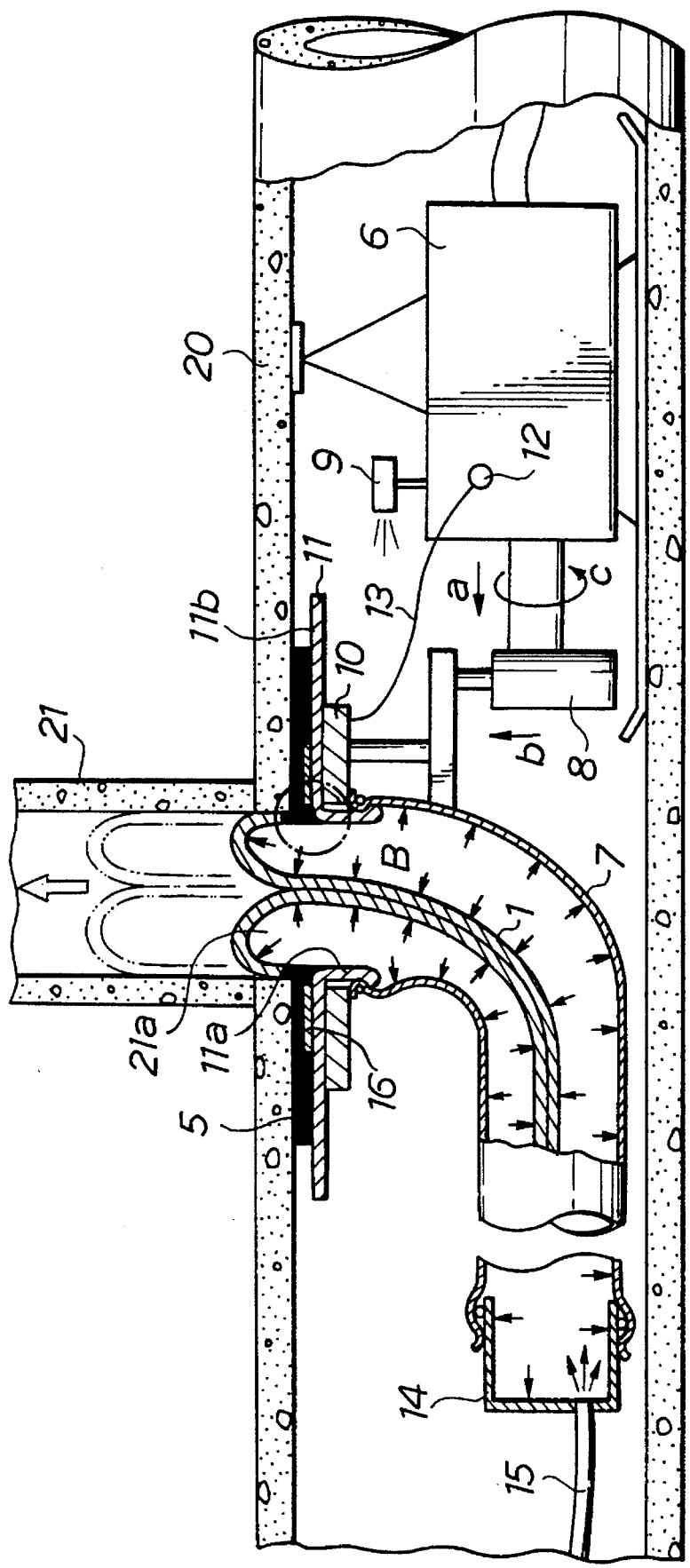
FIGS. 3 through 5 are cross-sectional views orderly showing how the branch pipe lining method of the present invention proceeds.

Referring first to FIG. 3, the main pipe 20 has the branch pipe 21, branched off therefrom, which has a diameter smaller than that of the main pipe 20. As can be seen, there have already been installed, inside the main pipe 20, a work robot 6, a pressure bag 7, the branch pipe liner bag 1 and so on which had previously been assembled and integrated on the ground.

The work robot 6 is hydraulically driven so as to direct a head thereof 8 in the directions indicated by the arrows a and b in FIG. 3 as well as rotate the same in the direction indicated by the arrow c. A TV camera 9 is mounted on the work robot 6 for monitoring the movement of the head 8.

An annular magnet 10 or more specifically electromagnet, is supported by the work robot 6, and a set nozzle 11 made of a magnetic material (iron in this embodiment) is mounted on the magnet 10. The magnet 10 in turn is connected to a switch 12 arranged on the main body of the work robot 6 through a cable 13, such that the magnet switch 12 is remotely operated from the ground.

The pressure bag 7 has one end thereof closed by a cap 14, and the other end forming an opening to which the outer periphery of a cylinder portion 11a of the set nozzle 11 is attached, as shown in FIG. 3. Then, the pressure bag 7 is connected to a compressor installed on the ground, not shown, through an air hose 15 coupled to the cap 14.

In the lower surface of the flange 5 of the branch pipe liner bag 1, there is embedded a ring-shaped magnetic plate 16 made, for example, of iron, as shown in FIG. 3, in such a manner that the magnetic plate 16 forms a flat surface together with the lower surface of the flange 5.

The branch pipe liner bag 1 is constructed such that the flange 5 thereof is attached to a flange portion 11b of the set nozzle 11. In this event, the magnet switch 12 arranged on the work robot 6 is manipulated to turn on the magnet 10 to cause the magnetic plate 16 embedded in the flange 5 to be electromagnetically attracted to the flange portion 11b of the set nozzle 11 by an electromagnetic force of the magnet 10, thus allowing the whole flange 5 to be closely contacted to the flange portion 11b of the set nozzle 11.

Over the whole inner perimeter of the lower surface of the flange 5, there is formed a protrusion 5a having a concave arcuate portion along the arcuate shape of the inner periphery of the set nozzle 11, as shown in greater detail in FIG. 6. With the flange 5 being tightly contacted to the set nozzle 11 as shown in FIG. 3, the protrusion 5a is in a tightly engaged relationship with the arcuate portion of the inner periphery of the set nozzle 11.

The attachment of the pressure bag 7 to the set nozzle 11, attachment of the flange 5 of the branch pipe liner bag 1 to the set nozzle 11, and so on as explained above, have previously be done on the ground such that the assembly of the integrated branch pipe liner bag 1, work robot 6 and pressure bag 7 are introduced as an integrated unit into the main pipe 20 as shown in FIG. 3.

Once the assembly is placed inside the main pipe 20, the situation within the main pipe 20 may be monitored on the ground by the TV camera 9 mounted on the work robot 6. After the flange 5 of the branch pipe liner bag 1 is positioned at an opening 21a of the branch pipe 21, the head 8 of the work robot 6 is moved in the direction indicated by the arrow b in FIG. 3 (upward direction) to press the flange 5 of the branch pipe liner bag 1 against the inner wall of the main pipe 20 around the perimeter of the branch pipe opening 21a such that the flange 5 is closely contacted with the inner wall of the main pipe 20 as illustrated.

Next, a compressor installed on the ground, not shown, is driven to supply compressed air into the pressure bag 7 through the air hose 15 to cause the branch pipe liner bag 1, receiving the pressure of the compressed air, to be everted and go forward inside the branch pipe 21 in the direction indicated by the white arrow. In this event, the air-tight connection between the branch pipe liner bag 1 and the pressure bag 7 is completely achieved by the close contact of the flange 5 of the branch pipe liner bag 1 to the set nozzle 11, wherein the protrusion 5a of the flange 5 ensures the sealing performance by its close contact with the arcuate portion of the set nozzle 11 (see FIG. 6). Also, since the tubular pipe liner bag 4 of the branch pipe liner bag 1 has the outer wall covered with the highly air-tight plastic films 2, 3 (before the branch pipe is everted), even if the branch pipe 21 is arranged at a rather steep angle with the main pipe 20, the thermosetting resin impregnated in the tubular pipe liner bag 4 will never flow down.

Figure 4:
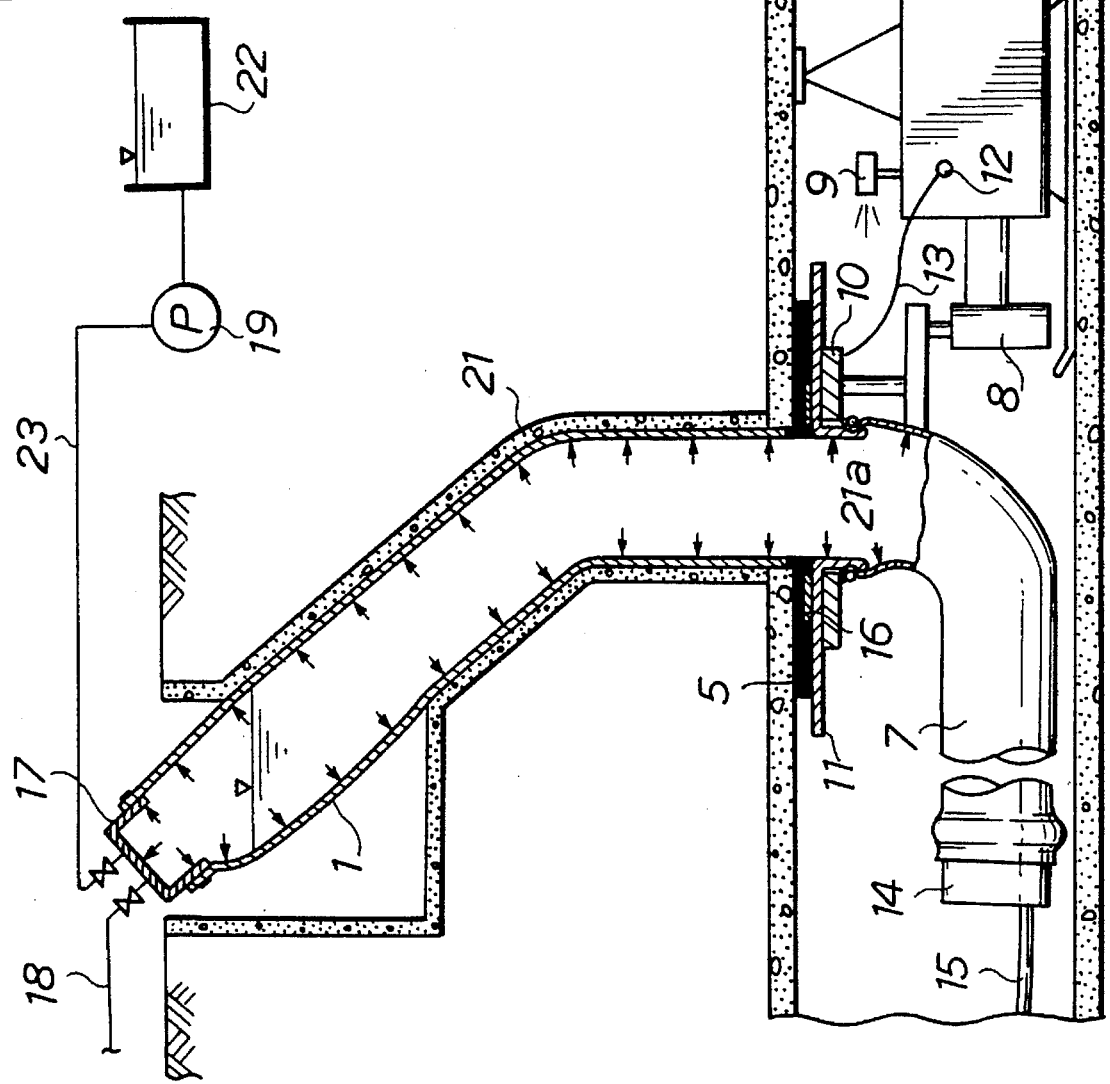
Figure 5:
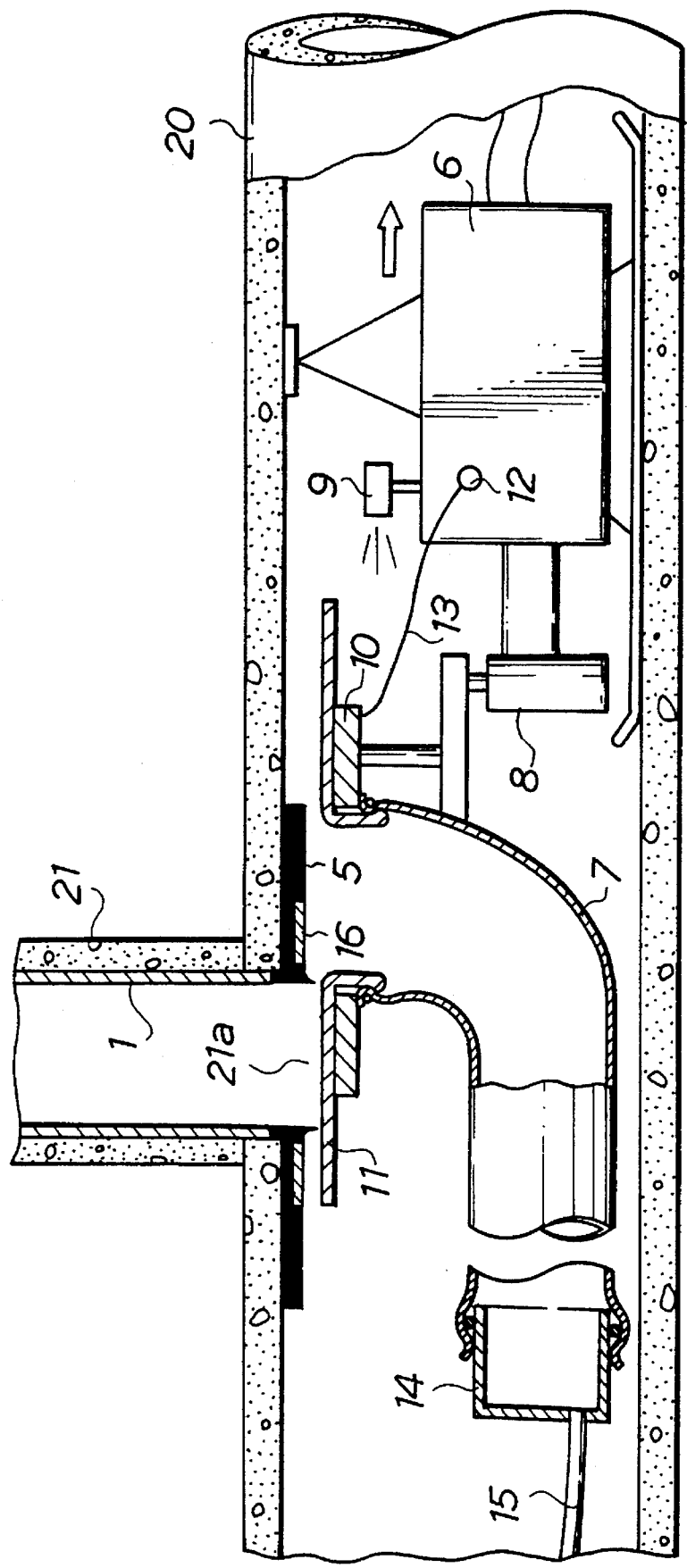

When the eversion and insertion of the branch pipe liner bag 1 into the branch pipe 21 has been completed, a cap 17 is attached to the open end of the branch pipe liner bag 1 as shown in FIG. 4. Compressed air is then supplied into the branch pipe liner bag 1 from an air hose 18 connected to the cap 17 to press the branch pipe liner bag 1 against the inner wall of the branch pipe 21. In this state, when a pump 19 is driven to inject hot water in a tank 22 into the branch pipe liner bag 1 through a hot water hose 23, the thermosetting resin impregnated in the branch pipe liner bag 1 is heated and accordingly cured, with the result that the branch pipe 21 is repaired by means of the cured branch pipe liner 1 which has been lined on the inner wall thereof.

When the lining of the branch pipe 21 has been completed as described above, hot water inside the branch pipe liner bag 1 is extracted. Then, the magnet switch 12 arranged on the work robot 6 is manipulated to turn off the magnet 10 by a remote control from the ground. This inhibits the magnet 10 from generating an electromagnetic force for attracting the magnetic plate 16 arranged on the branch pipe liner bag side, so that the set nozzle 11 may be readily detached from the branch pipe liner bag 1. Thus, the movement of the work robot 6, for example, in the direction indicated by the arrow in FIG. 5 (in the right direction in FIG. 5) will cause the pressure bag 7 attached to the set nozzle 11 to move together with the work robot 6 in the same direction to the outside of the main pipe 20, thus terminating the lining operation for the branch pipe 21.

As described above, when the lining operation for the branch pipe 21 is complete, the magnet 10 is turned off to allow the pressure bag 7 and the work robot 6 to be readily detached from the branch pipe liner bag 1, thus preventing the occurrence of the aforementioned inconvenience inherent in the prior art method that part of a peel-back tube may be left unpeeled inside the branch pipe liner bag.

According to the present embodiment as described above, the air-tight connection between the pressure bag 7 and the branch pipe liner bag 1 is directly achieved by an electromagnetic force of the magnet 10. Further, since the pressure bag 7 and the branch pipe liner bag 1 may be easily detached only by turning off the magnet 10 after the lining operation is completed for the branch pipe 21, a peel-back tube, which would be otherwise required by the conventional lining method is made unnecessary, with the result that the branch pipe 21 can be more easily lined.

As can be clearly understood from the foregoing description, according to the present invention, the open end of the pressure bag is connected to the set nozzle attached to the work robot which is movably introduced in a main pipe. The pressure bag is provided inside thereof with the branch pipe liner bag impregnated with a thermosetting resin and having a flange comprising an annular magnetic plate at one end. One end of the branch pipe liner bag on the flange side is pulled out from the pressure bag and everted. The magnetic plate is electromagnetically attracted to the set nozzle by turning on a magnet provided in the work robot to tightly connect the flange to the set nozzle. In this state, a pressured fluid is supplied into the pressure bag to cause the branch pipe liner bag to be everted and inserted into the branch pipe. With the branch pipe liner bag being left pressed against the inner wall of the branch pipe, the thermosetting resin impregnated in the branch pipe liner bag is cured by supplying hot water into the pressure bag. Then, after extracting the hot water from the pressure bag, the flange is disengaged from the set nozzle by turning off the magnet, and the work robot and the pressure bag are separated from the branch pipe liner bag. It will be appreciated that this method allows a direct air-tight connection between the pressure bag and the branch pipe liner bag to be made in a simple structure without employing a conventionally required sealed tube, so that the branch pipe can be more easily lined.

While the invention has been described in its preferred embodiment, it is to be understood that modifications will occur to those skilled in the art without departing from the spirit of the invention. For instance, the thermosetting resin may be replaced by another hardenable resin such as thermosetting resin. The scope of the invention is therefore to be determined solely by the appended claims.

What is claimed is:

1. A method for lining a branch pipe branching off a main pipe comprising the steps of:

(a) attaching an open end of a pressure bag to a set nozzle provided in a work robot movably introduced in said main pipe, said set nozzle including an electromagnet, said electromagnet being adapted to be turned on and off by remote control;

(b) placing in said pressure bag a branch pipe liner bag impregnated with a thermosetting resin and having a flange at one end thereof, said flange comprising an magnetic plate made of a material capable of being attracted by a magnet embedded therein;

(c) pulling out one end of said branch pipe liner bag at the flange side from said pressure bag and everting said branch pipe liner bag;

(d) electromagnetically attracting said magnetic plate embedded in said flange toward said set nozzle by turning on said electromagnet to tightly connect said flange to said set nozzle;

(e) supplying a pressurized fluid into said pressure bag with said flange being closely contacted to the inner wall of the main pipe around the perimeter of a branch pipe opening to evert and insert said branch pipe liner bag into the branch pipe;

(f) curing the thermosetting resin impregnated in said branch pipe liner bag, said branch pipe liner bag being left pressed against the inner wall of the branch pipe until said thermosetting resin is cured; and (g) disengaging said flange from said set nozzle by turning off said magnet and removing said work robot and said pressure bag from said branch pipe liner bag.

2. A branch pipe lining method according to claim 1, wherein said set nozzle is made of a material capable of being attracted by a magnet.

3. A branch pipe lining method according to claim 1, wherein said step (f) includes the step of supplying hot water into said pressure bag to thereby cure said thermosetting resin with heat conducted from said hot water.

4. A branch pipe lining apparatus for lining a branch pipe branching off a main pipe with a branch pipe liner bag which includes a tubular liner impregnated with a thermosetting resin and has a flange formed at one end thereof, comprising:

a work robot, placed in said main pipe, including a main body, a head and an electromagnet;

a set nozzle supported on said electromagnet;

a pressure bag having an open end connected to said set nozzle and the other end closed by a cap; and an annular plate made of a material capable of being attracted by a magnet and embedded in said flange of said tubular liner, said annular plate being adapted to be attracted by said electromagnetic in a manner such that said flange is tightly connected to said set nozzle when said electromagnet is turned on.

5. A branch pipe lining apparatus according to claim 4, wherein said set nozzle is made of a material capable of being attracted by a magnet.

* * * * *